(12) United States Patent
Barker et al.

(10) Patent No.: US 10,180,128 B2
(45) Date of Patent: Jan. 15, 2019

(54) SYSTEM AND METHOD FOR CATEGORIZING TRIP FAULTS OF A WIND TURBINE POWER CONVERTER

(71) Applicant: General Electric Company, Schenectady, NY (US)

(72) Inventors: Sidney Allen Barker, Troutville, VA (US); James Thomas Bailey, Roanoke, VA (US); Bruce Allen Gerritsen, Salem, VA (US); Minesh Ashok Shah, Clifton Park, NY (US); Ramy Michael Souri, Greer, SC (US); Raju Singamsetti, Hyderabad (IN); Achchugatla Vikramaditya, Hyderabad (IN)

(73) Assignee: General Electric Company, Schenectady, NY (US)

( * ) Notice: Subject to any disclaimer, the term of this patent is extended or adjusted under 35 U.S.C. 154(b) by 84 days.

(21) Appl. No.: 15/293,321

(22) Filed: Oct. 14, 2016

(65) Prior Publication Data
US 2017/0122291 A1 May 4, 2017

(30) Foreign Application Priority Data
Oct. 29, 2015 (IN) .......................... 5846/CHE/2015

(51) Int. Cl.
*F03D 17/00* (2016.01)
*F03D 7/04* (2006.01)
*G05B 19/048* (2006.01)

(52) U.S. Cl.
CPC ............ *F03D 7/043* (2013.01); *F03D 7/048* (2013.01); *F03D 17/00* (2016.05); *G05B 19/048* (2013.01);
(Continued)

(58) Field of Classification Search
CPC .......... F03D 17/00; F03D 7/043; F03D 7/048; F05B 2220/706; F05B 2270/504; G05B 19/048; G05B 2219/2619
See application file for complete search history.

(56) References Cited

U.S. PATENT DOCUMENTS

| 8,378,515 B2 | 2/2013 | Fortmann |
| 8,433,539 B2 | 4/2013 | Ishioka et al. |

(Continued)

FOREIGN PATENT DOCUMENTS

| JP | 2009303318 | 12/2009 |
| JP | 5286935 B2 | 9/2013 |
| WO | WO 2002/33802 A1 | 4/2002 |

*Primary Examiner* — Yuhui R Pan
(74) *Attorney, Agent, or Firm* — Dority & Manning, P.A.

(57) ABSTRACT

The present subject matter is directed to a method for managing and/or categorizing trip faults of an electrical component, such as power converter, of a wind turbine. The method includes receiving, via a local controller of the wind turbine, an indication of at least one trip fault in the electrical component of the wind turbine. The method also includes determining, via the local controller, a unique identifier for the trip fault. More specifically, the unique identifier contains information regarding a type of the trip fault and at least one of an origin or a cause, of the trip fault. Further, the method includes sending, via the local controller, the unique identifier to a supervisory controller of the wind turbine. Thus, the method also includes implementing, via the supervisory controller, a control action based on the unique identifier.

14 Claims, 6 Drawing Sheets

(52) U.S. Cl.
CPC ... *F05B 2220/706* (2013.01); *F05B 2270/504* (2013.01); *G05B 2219/2619* (2013.01); *Y02E 10/723* (2013.01); *Y02E 10/725* (2013.01)

(56) References Cited

U.S. PATENT DOCUMENTS

| | | |
|---|---|---|
| 8,976,034 B2 | 3/2015 | Yoo |
| 2002/0029097 A1* | 3/2002 | Pionzio, Jr. ............. F03D 7/047 700/286 |
| 2012/0053984 A1* | 3/2012 | Mannar .............. G06Q 10/0635 705/7.28 |
| 2012/0077527 A1 | 3/2012 | Santiago et al. |
| 2013/0076327 A1* | 3/2013 | Wagoner ................. H02M 1/32 323/304 |
| 2013/0282336 A1 | 10/2013 | Maeda et al. |

\* cited by examiner

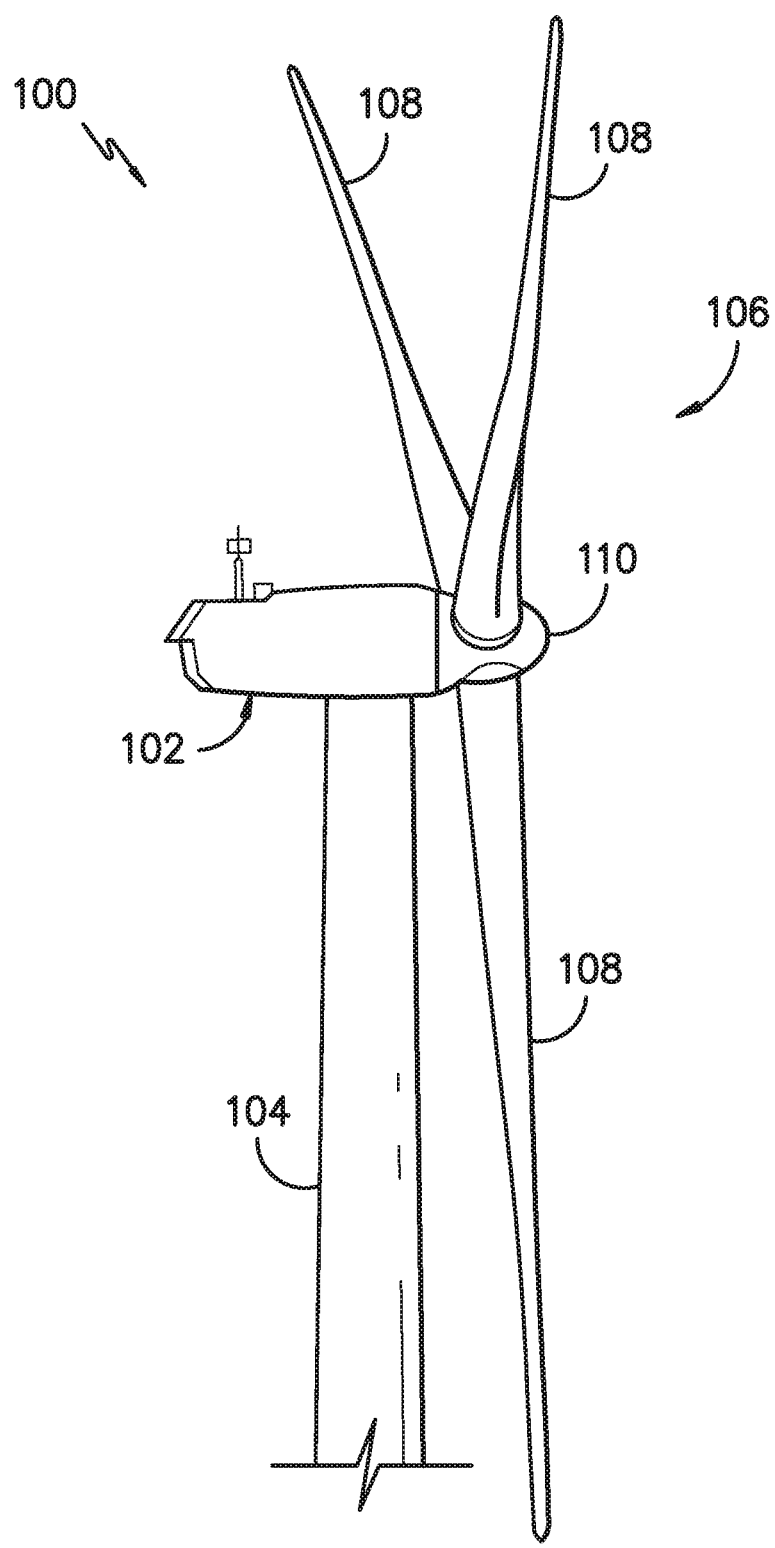
FIG. -1-

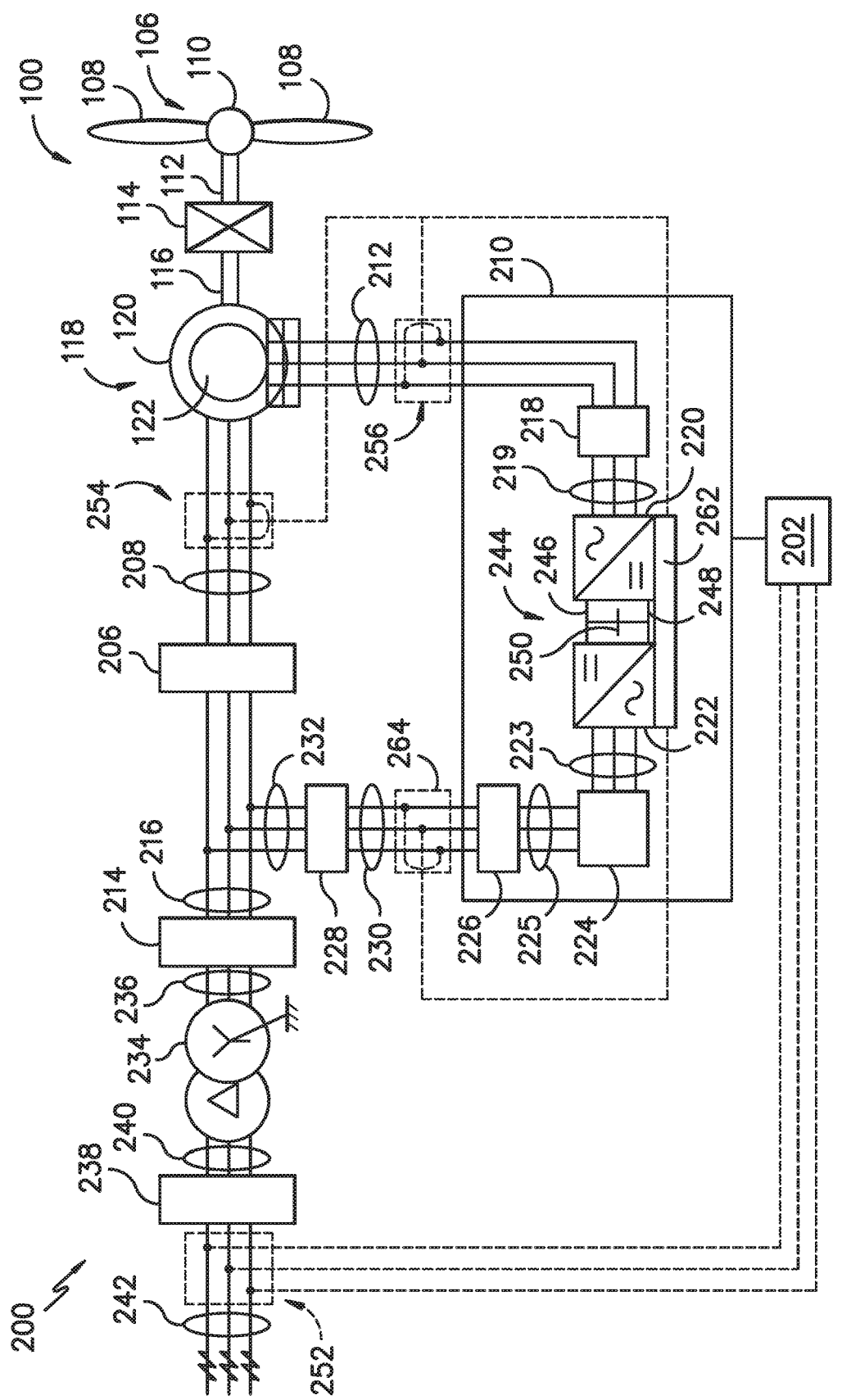
FIG. -2-

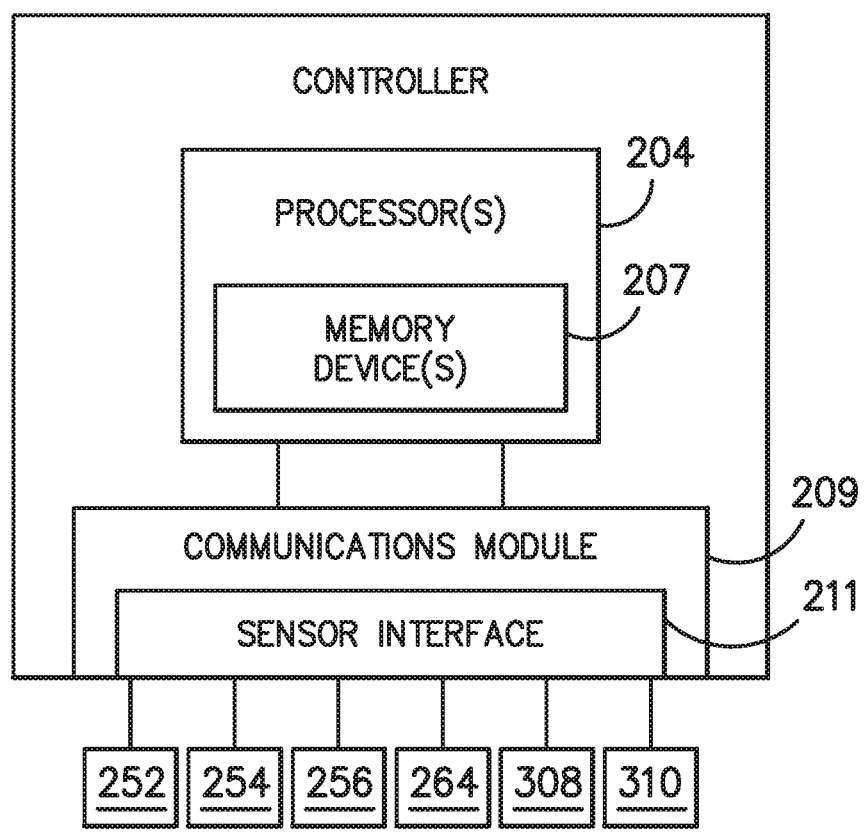
FIG. -3-

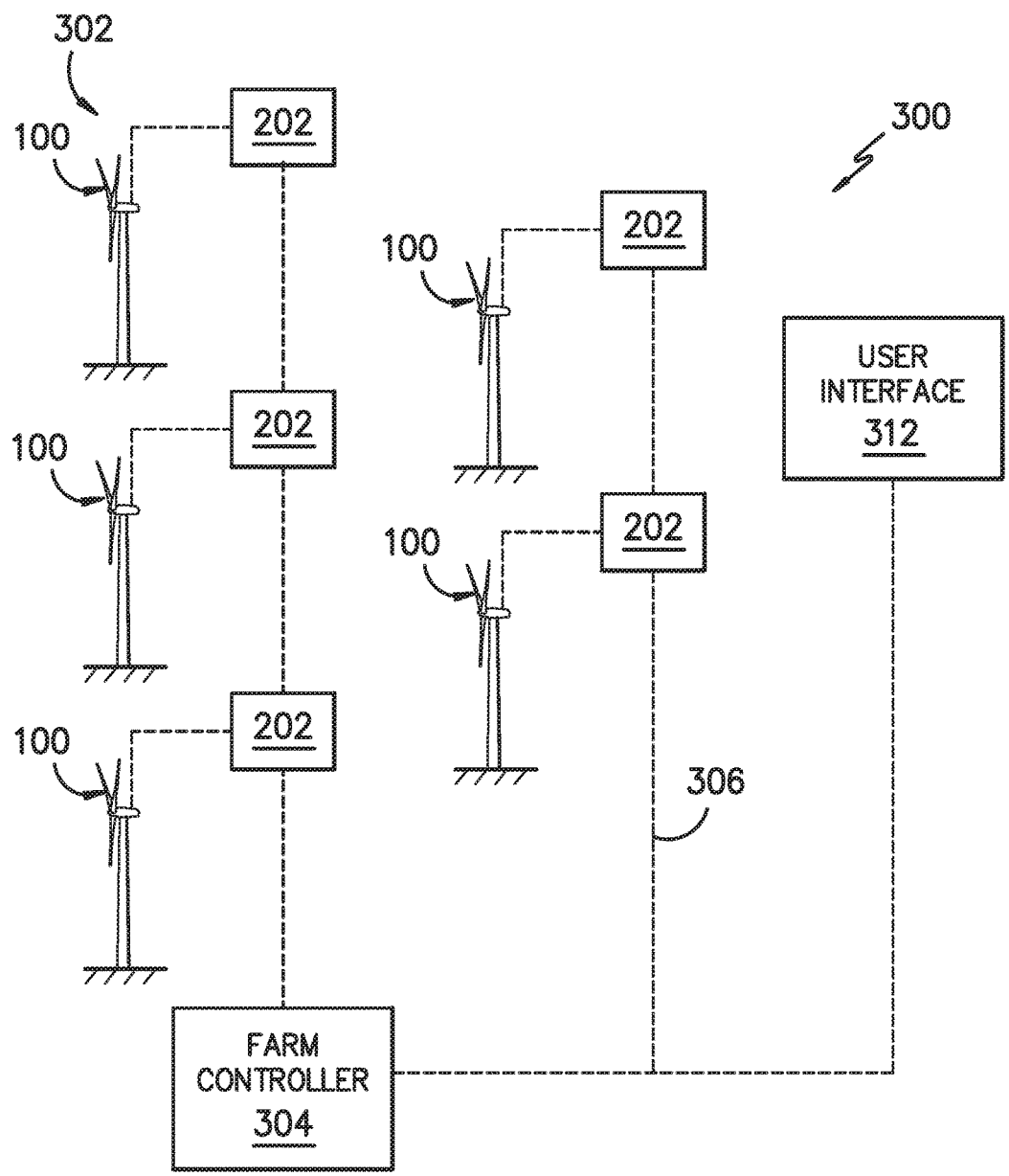
FIG. -4-
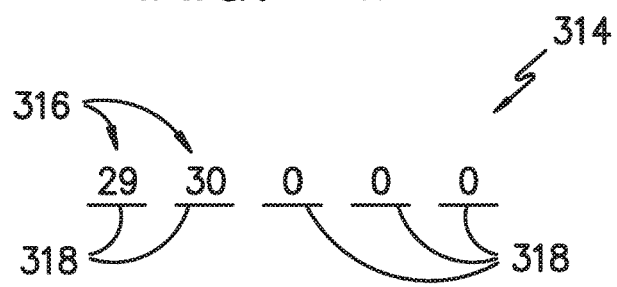
FIG. -5-

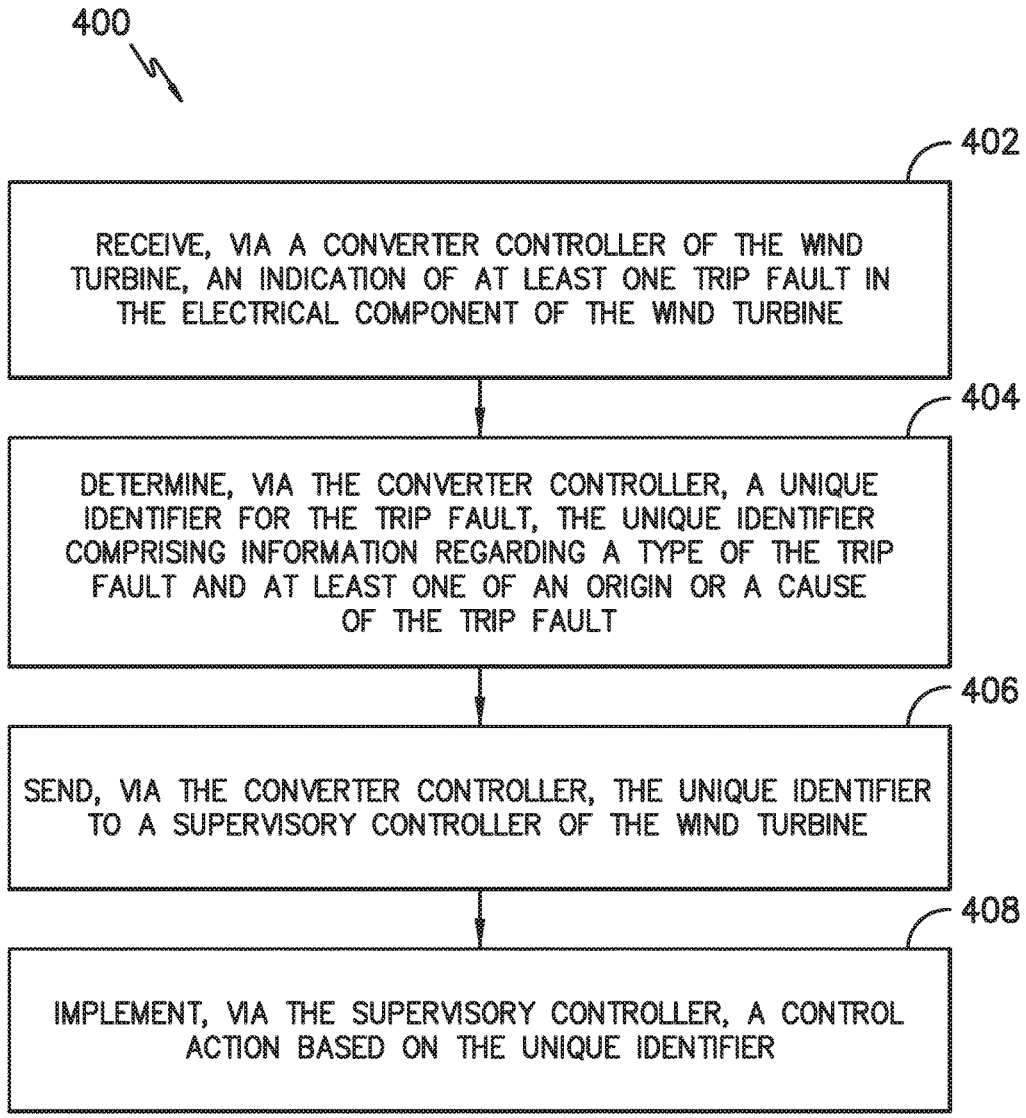
FIG. -6-

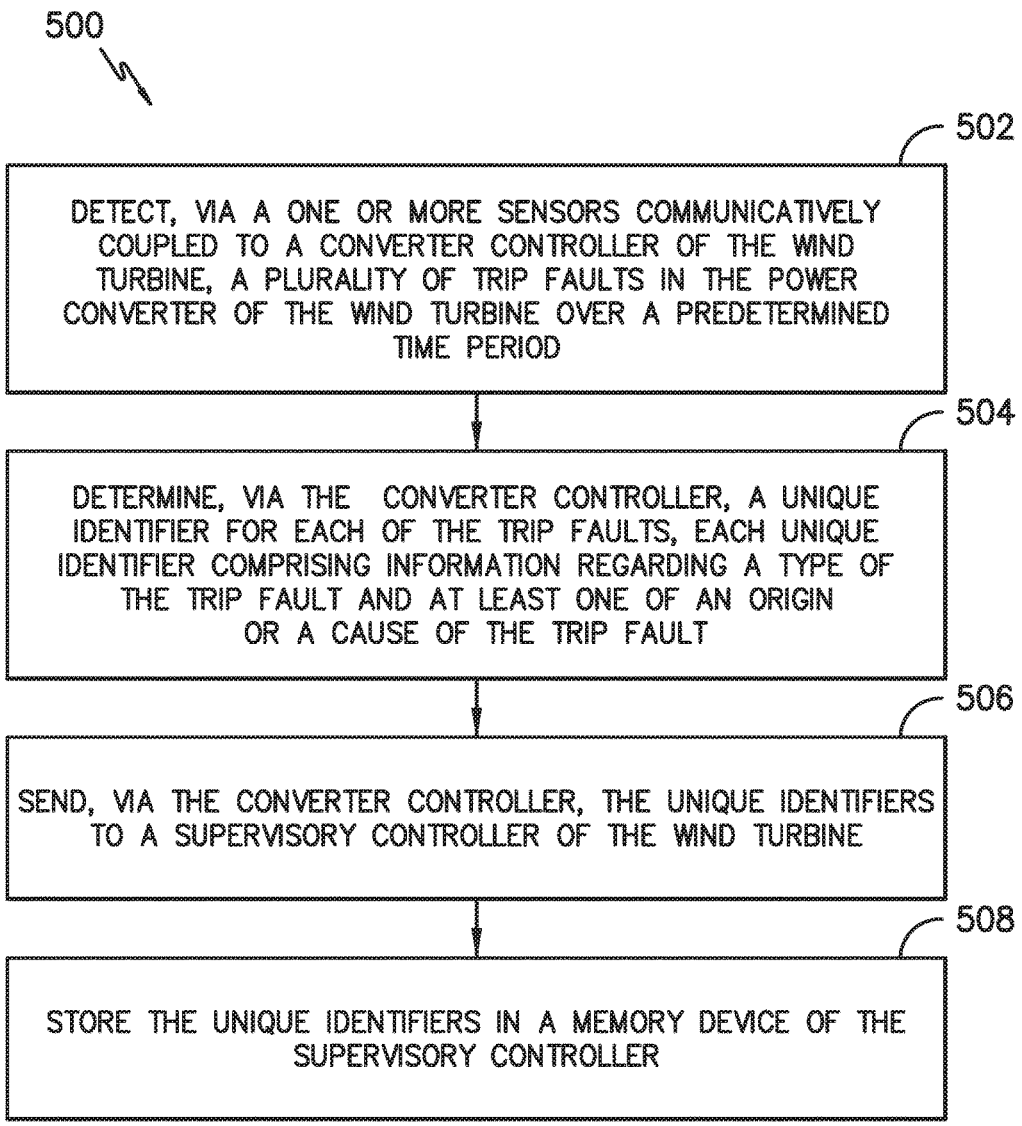
FIG. -7-

SYSTEM AND METHOD FOR CATEGORIZING TRIP FAULTS OF A WIND TURBINE POWER CONVERTER

FIELD OF THE INVENTION

The present disclosure relates generally to wind turbines and, more particularly, to a system and method for categorizing trip faults of a power converter of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

More specifically, some wind turbines, such as wind-driven doubly-fed induction generator (DFIG) systems or full power conversion systems, include a power converter, e.g. with an AC-DC-AC topology. Standard power converters typically include a bridge circuit, a power filter and optionally a crowbar circuit. In addition, the bridge circuit typically includes a plurality of cells, for example, one or more power switching elements and/or one or more diodes.

Such wind turbines can experience costly down time whenever a power converter, or other electrical components, experiences a trip fault. Investigating the cause of the various trips can be time consuming and may require offsite or onsite root cause analysis. Known power converters typically categorize all trips into four broad groups, including for example, voltage, current, thermal, and other, and then distinguish each of the four categories by either the line-side power converter or the rotor-side power converter, creating a total of eight categories. Such category bits are then communicated to the supervisory turbine control. This broad converter trip categorization system, however, has proven unsuitable for providing customers and service personnel with enough detail to understand what type of service the converter might need. Further, present categorization systems fail to allow the proper counters in the turbine controller to be incremented in an attempt to maintain a historical record of the causes of turbine down-time.

Accordingly, a system and method that provides a more resolved categorization of converter trips in the power converter of the wind turbine would be advantageous. More specifically, a system and method that better pinpoints the type of trip that caused the turbine to go off line would be welcomed in the art. Thus, the present disclosure is directed to an improved system and method for categorizing trip faults of a power converter of a wind turbine that address the aforementioned issues.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for managing trip faults of an electrical component, such as a power converter, of a wind turbine. The method includes receiving, via a local controller of the wind turbine, an indication of at least one trip fault in the electrical component of the wind turbine. The method also includes determining, via the local controller, a unique identifier for the trip fault. More specifically, the unique identifier contains information regarding a type of the trip fault, as well as an origin and/or a cause of the trip fault. Further, the method includes sending, via the local controller, the unique identifier to a supervisory controller of the wind turbine. Thus, the method also includes implementing, via the supervisory controller, a control action based on the unique identifier.

In one embodiment, the method includes detecting, via one or more sensors, the at least one trip fault in the electrical component of the wind turbine. More specifically, in certain embodiments, the sensor(s) may include voltage sensors, electric current sensors, temperature sensors, humidity sensors, airflow sensors, or any other suitable sensors configured to detect trip faults and generate corresponding signals that can be sent to the local and/or supervisory controller.

In another embodiment, the supervisory controller may include a turbine controller of the wind turbine or a farm-level controller of a wind farm comprising the wind turbine. Similarly, the local controller may include a converter controller of the power converter or the turbine controller.

In further embodiments, the step of determining the unique identifier for the trip fault may include generating a trip fault category list having a plurality of trip fault categories and assigning at least one of the trip fault categories from the trip fault category list to the detected trip fault. Thus, in such embodiments, the unique identifier includes the corresponding trip fault categories selected from the list.

In another embodiment, the method may also include modifying the trip fault category list. More specifically, in certain embodiments, the step of modifying the trip fault category list further comprises at least one of adding new trip fault categories, splitting existing trip fault categories into one or more narrower trip fault categories, or deleting one or more of the trip fault categories.

In additional embodiment, the step of determining the unique identifier for the trip fault may include determining, via the supervisory controller, the type of the trip fault as well as the origin and/or cause of the trip fault, and selecting the unique identifier from the trip fault category list based on the type of the trip fault and the origin and/or cause of the trip fault.

In yet a further embodiment, the method may also include storing the unique identifier in a memory device of the local controller and/or the supervisory controller of the wind turbine. More specifically, in certain embodiments, the unique identifier(s) may be stored in a memory device of a farm-level controller or in a data repository, e.g. such as the cloud for the purposes of fleet-level analysis. As such, in certain embodiments, the stored unique identifiers can be organized or sorted in the memory device based on one or more of the following categories: type, origin, and/or cause of the trip fault over a predetermined time period. In addition, the controller may be configured to utilize the memory device or data repository to develop statistics, trends, failure modes, etc. via data analysis, statistical algorithms, or similar. Accordingly, in such embodiments, the method may also include counting the unique identifiers for each of the categories stored in at least one of the converter controller or the supervisory controller.

In yet another embodiment, the method may include providing, via a user interface, a signal to a user if the stored unique identifiers for one or more of the categories exceed a predetermined threshold.

In certain embodiments, the unique identifier may include a plurality of unique numeral indicators. Thus, in particular embodiments, each of the unique numeral indicators may represent a different trip fault. More specifically, in one embodiment, a positive or negative value for the numeral indicators may represent a trip fault occurring in the electrical component, whereas a zero value for the numeral indicator may represent no trip fault occurring in the electrical component.

In specific embodiments, the electrical component in the wind turbine as described herein may include any electrical component of the wind turbine including but not limited to a power conversion assembly, a transformer, a generator, down-tower cables, turbine control hardware, yaw hardware, pitch hardware, or similar.

In another aspect, the present disclosure is directed to a method for categorizing trip faults of a power converter of a wind turbine. The method includes detecting, via a one or more sensors communicatively coupled to a converter controller of the wind turbine, a plurality of trip faults in the power converter of the wind turbine over a predetermined time period. The method also includes determining, via the converter controller, a unique identifier for each of the trip faults. More specifically, each unique identifier includes information regarding a type of the trip fault, as well as an origin and/or cause of the trip fault. Thus, the method also includes sending, via the converter controller, the unique identifier to a supervisory controller of the wind turbine. Further, the method includes storing the unique identifier(s) in a memory device of the supervisory controller.

In yet another aspect, the present disclosure is directed to a system for managing trip faults of an electrical component of a wind turbine in a wind farm. The system includes a supervisory controller configured to provide supervisory control to the wind turbine in the wind farm, a local controller configured to provide local control of the wind turbine, and one or more sensors configured to detect trip faults of the electrical component of the wind turbine. More specifically, the local controller is communicatively coupled to the supervisory controller via a network. For example, in certain embodiments, the local controller may be a converter controller, whereas the supervisory controller may be a turbine controller. In additional embodiments, the local controller may be a turbine controller, whereas the supervisory controller may be a farm-level controller. Thus, the local controller and/or the supervisory controller are configured to perform one or more operations, including but not limited to determining a unique identifier for a detected trip fault. More specifically, the unique identifier contains information regarding a type of the trip fault, as well as origin and/or cause of the trip fault. In addition, the local controller and/or the supervisory controller are configured to implement a control action based on the unique identifier. It should be understood that the system may be further configured with the additional features and/or to perform the additional method steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a portion of one embodiment of a wind turbine according to the present disclosure;

FIG. 2 illustrates a schematic view of one embodiment of an electrical and control system suitable for use with the wind turbine shown in FIG. 1;

FIG. 3 illustrates a block diagram of one embodiment of suitable components that may be included in a controller according to the present disclosure;

FIG. 4 illustrates a schematic diagram of one embodiment of a system for managing trip faults of an electrical component of a wind turbine according to the present disclosure;

FIG. 5 illustrates one example of a unique identifier generated by a controller according to one embodiment of the present disclosure;

FIG. 6 illustrates a flow diagram of one embodiment of a method for managing trip faults of an electrical component of a wind turbine according to the present disclosure; and, FIG. 7 illustrates a flow diagram of one embodiment of a method for categorizing trip faults of a power converter of a wind turbine according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for managing and/or categorizing trip faults of an electrical component, e.g. a power converter, of a wind turbine. For example, in one embodiment, the system may include one or more sensors configured to detect at least one trip fault in the electrical component of the wind turbine. Further, the system is configured to determine a unique identifier for the trip fault that includes information regarding the type of fault, as well as the origin and/or cause of the trip fault. More specifically, the system may include a controller having a trip category list stored therein with numerous diagnostic trip categories. New categories can be created and easily added to the list as needed. Every trip category is associated with a unique numeral indicator. Thus, when a trip fault is detected, the system is configured to generate a unique identifier containing one or more of the numeral indicators regarding the category of the trip fault to a user. In addition, the system is configured to implement a control action based on the unique identifier, e.g. either automatically or based on user input.

Accordingly, the system and method of the present disclosure provides improved diagnostic functionality for trip faults that allow new trip categories to be added to the trip category list, the addition of new diagnostic trips, re-categorization of existing trips to an existing or new trip category, and multiple trips to be instantiated from a single diagnostic class by uniquely identifying the trip with its own trip category.

Referring now to the drawings, FIG. 1 is a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a breaker-side bus 240, a grid circuit breaker 238, and a grid bus 242.

The generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

During operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with a converter controller 262 and/or a turbine controller 202 configured to control the operation of the rotor-side power converter 220 and the line-side power converter 222. For example, during operation, the controller 202 may be configured to receive one or more voltage and/or electric current measurement signals from a first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 264 (all shown in FIG. 2), and/or any other suitable sensors. Further, the voltage and electric current sensors 252, 254, 256, 264 may be configured to measure, directly or indirectly, a power output of the wind turbine 100.

In addition, the converter controller 262 is configured to receive one or more voltage and electric current measurement signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 264. In addition, the converter controller 262 may be configured with any of the features described herein in regards to the turbine controller 202. Further, the converter controller 262 may be separate from or integral with the turbine controller 202.

Further, the control system 200 may include one or more temperature sensors 308, 310 (FIG. 3) configured to measure a temperature of a wind turbine component. For example, in certain embodiments, the local temperature may correspond to an actual temperature of the component, an area containing the component, a temperature inside of the component, or similar.

Thus, the wind turbine controller 202, as well as the converter controller 262, is configured to control various components of the wind turbine 100. Accordingly, as shown particularly in FIG. 3, the controllers 202, 262 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 264, 308, 310) may be communicatively coupled to the communications module 209 using any suitable means. For example, as shown in FIG. 3, the sensors 252, 254, 256, 264, 308, 310 may be coupled to the sensor interface 211 via a wired connection. However, in other embodiments, the sensors 252, 254, 256, 264, 308, 310 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

It should also be understood that any number or type of sensors may be employed within the wind turbine 100 and at any location. For example, the sensors as described herein may be temperature sensors, Micro Inertial Measurement Units (MIMUs), strain gauges, accelerometers, pressure sensors, humidity sensors, airflow sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors.

Referring now to FIG. 4, a schematic diagram of one embodiment of a system 300 for managing and/or categorizing trip faults of an electrical component of a wind turbine 100 in a wind farm 302 is illustrated. In certain embodiments, as described herein, the electrical component(s) of the wind turbine 100 may include at least one of the power conversion assembly 210, the transformer 234, the generator 118, down-tower cables, turbine control hardware, yaw hardware, pitch hardware, or any other suitable component that may experience trip fault during operation of the wind turbine 100. In addition, the system 300 may utilize existing wind turbine hardware, new hardware, and/or a combination thereof.

Thus, as shown, the system 300 may utilize a farm-level controller 304 and/or turbine controllers 202 to provide supervisory control to a plurality of wind turbines 100 in the wind farm 302, as well as a converter controller 262 configured to provide local control of the individual wind turbine(s) 100. In addition, the system 300 may utilize one or more sensors 252, 254, 256, 264, 308, 310 configured to detect trip faults of the various electrical component of the wind turbine(s) 100. More specifically, as shown, the individual turbine controllers 202 are communicatively coupled to the farm-level controller 304 via a network 306. Thus, the various controllers 202, 262, 304 as described herein are configured to perform the method steps of the present disclosure.

For example, as shown in FIG. 6, a flow diagram of a method 400 that may be implemented by one or more of the controllers 202, 262, 304 for managing and/or categorizing trip faults of an electrical component, e.g. the power conversion assembly 210, of a wind turbine 100 (or a plurality of wind turbines 100 in a wind farm 302) is illustrated. As shown at 402, the method 400 includes receiving, e.g. via the converter controller 262, an indication of at least one trip fault in an electrical component of one or more of the wind turbine 100. For example, in certain embodiments, the method 400 includes detecting at least one trip fault in the power converter 210 of the wind turbine 100 via one or more of the sensors 252, 254, 256, 264, 308, 310. Thus, upon detection of a trip fault, the sensors 252, 254, 256, 264, 308, 310 are configured to generate corresponding signals to send to one or more of the controllers 202, 262, 304 so as to indicate that a trip fault has occurred or is occurring.

Accordingly, as shown at 404, the method 400 may include determining, e.g. via the converter controller 262, a unique identifier 314 (FIG. 5) for each of the detected trip faults. More specifically, the unique identifier 314 includes a unique combination of trip fault categories containing information regarding the type, as well as the origin and/or cause of each of the trip faults. For example, in certain embodiments, the step of determining the unique identifier 314 for the trip fault may include generating a trip fault category list having a plurality of trip fault categories, e.g. as shown in Table 1. More specifically, as shown in Table 1, the trip category list may be programmed or stored in the controllers 202, 262, 304. Thus, the trip category list allows all trip categories to be re-used on multiple converter platforms. In addition, new trip categories can be created and easily added to the trip category list. Further, existing categories of the list may be continuously modified and/or updated to ensure proper diagnostics of trip faults. For example, in one embodiment, if a trip category is perceived as being too vague for data analytic rules, then the category can be split into finer trip fault categories for more detailed analysis. More specifically, in certain embodiments, if the power conversion assembly 210 has five hundred (500) possible trip faults, the controllers 202, 262, 304 may contain a trip fault category list having 500 or less categories, more preferably about 50 to 100 trip fault categories. As such, each of the trip faults can be assigned to a unique category.

It should be understood that Table 1 is provided for illustrative purposes only and is not intended to be limiting. Thus, the controllers 202, 262, 304 as described herein may be pre-programmed with any suitable trip fault category list having any number of categories that can be continuously updated and/or modified according to any particular wind turbine.

| Numeral Indicators | Trip Fault Category |
|---|---|
| 1 | Blown Fuses |
| 2 | Contactor or Breaker |
| 3 | Cooling System |
| 4 | Code Sequencing |
| 5 | DC Link Over-Voltage Condition |
| 6 | Down-Tower Assembly (DTA) Fan |
| 7 | DTA Wiring Connection |
| 8 | IGBT Damage |
| 9 | Invalid Printed Wiring Assembly (PWA), Line Bridge Board |
| 10 | Invalid PWA, Rotor Bridge Board |
| 11 | Reverse Power |
| 12 | Power Supply |
| 13 | Wiring Issue, Rotor Converter or Stator |
| 14 | Wiring Issue, Grid or Line Converter |
| 15 | Generator I/O Board |
| 16 | Grid Frequency |
| 17 | Tachometer |
| 18 | Thermistor Failure or Thermistor Connections |
| 19 | Dynamic-Brake Fault |
| 20 | Controller-to-Controller Communication |
| 21 | Converter State Transition |
| 22 | DC Link Under-Voltage Condition |
| 23 | Drive Train Torsional |
| 24 | DTA Over-Temperature Condition |
| 25 | DTA Pump |
| 26 | Grid Single Phase Open |
| 27 | Grid Three Phase Open |
| 28 | Grid Islanding |
| 29 | Grid Loss |
| 30 | Grid Overvoltage |
| 31 | Grid Transient |
| 32 | Grid Under-Voltage Condition |
| 33 | Grid Voltage Imbalance |
| 34 | Grid Fast Disconnect |
| 35 | Grid Fast Blocking |
| 36 | Synchronization |
| 37 | Ground Fault, Line Converter |
| 38 | Ground Fault, Stator |
| 39 | Ground Fault, Transformer Secondary |
| 40 | Ground Fault, Rotor |
| 41 | Thermal Turbine Shutdown |
| 42 | IGBT or Diode Junction Over-Temperature, Dynamic Brake Circuit |
| 43 | Timed Over-Current Condition, Line Converter or Grid |
| 44 | Timed Over-Current, Rotor Converter or Stator |
| 45 | Regulator Saturation, Line Converter |
| 46 | Regulator Saturation, Rotor Converter |
| 47 | Torque Regulation |
| 48 | Toolbox Communication Error |
| 49 | Misconfiguration by Parameter |
| 50 | Invalid Generator |
| 51 | Firmware Process Error |
| 52 | Invalid PWA, Line I/O Board |
| 53 | Invalid PWA, Rotor I/O Board |
| 54 | Grid Distortion |
| 55 | Rotor Timed Over-Voltage Condition |
| 56 | Grid Voltage or Frequency Out of Tolerance |
| 57 | Improper Turbine Control Sequencing |
| 58 | Safety Chain Trip |
| 59 | Over-Speed Condition |
| 60 | Under-Speed Condition |
| 61 | IGBT or Diode Junction Over-Temperature, Line Converter |
| 62 | IGBT or Diode Junction Over-Temperature, Rotor Converter |
| 63 | IGBT or Diode Junction Under-Temperature, Line Converter |
| 64 | IGBT or Diode Junction Under-Temperature, Rotor Converter |
| 65 | Current Offset, Line Bridge |
| 66 | Current Offset, Rotor Bridge |
| 67 | Current Offset, Line I/O Card |
| 68 | Current Offset, Rotor I/O Card |
| 69 | Voltage Offset, Line Bridge |
| 70 | Voltage Offset, Rotor Bridge |
| 71 | Voltage Offset, Line I/O Card |
| 72 | Voltage Offset, Rotor I/O Card |
| 73 | IGBT Desaturation, Line Bridge |
| 74 | IGBT Desaturation, Rotor Bridge |
| 75 | Cell Test Failure Manual, Line Converter |
| 76 | Cell Test Failure Manual, Rotor Converter |
| 77 | Cell Test Failure at Startup, Line Converter |
| 78 | Cell Test Failure at Startup, Rotor Converter |
| 79 | Instantaneous Over-Current (IOC), Line Converter |
| 80 | IOC, Rotor Converter |
| 81 | IOC, DB IGBT |
| 82 | Gate Drive Power Supply Under-Voltage, Line Alternative Energy Dynamic Brake Card (AEDB) or Alternative Energy Bridge Interface Card (AEBI) |
| 83 | Gate Drive Power Supply Under-Voltage, Rotor AEBI |
| 84 | High Speed Serial Link (HSSL)/High Speed Link Assembly (HSLA), Line Converter |
| 85 | HSSL/HSLA, Rotor Converter |
| 86 | I/O Board Gain or Offset Out of Tolerance, Line |
| 87 | I/O Board Gain or Offset Out of Tolerance, Rotor |

Thus, the step of determining the unique identifier 314 for the trip fault(s) may include assigning one or more of the trip fault categories from the trip fault category list (Table 1 above) to the detected trip fault(s). More specifically, in certain embodiments, numerous trip faults may be detected at one time. As such, one or more of the detected trip faults may be assigned to the same category (or may be assigned to different categories) depending on the type, origin, and/or cause of the trip fault. Thus, in particular embodiments, the step of determining the unique identifier 314 for the trip fault may include determining, via the supervisory controller 202, 304, the type of the trip fault as well as the origin and/or cause of the trip fault, and selecting the unique identifier 314 from the trip fault category list based on the type of the trip fault, as well as the origin and/or cause of the trip fault. Accordingly, the unique identifier 314 is configured to communicate one or more finely resolved categories of individual trip faults to the supervisory controller 202, 304 without giving the entire list of trip faults.

In certain embodiments, the unique identifier 314 may include a plurality of unique numeral indicators 316, e.g. as shown in Table 1 and FIG. 5. Thus, in particular embodiments, each of the unique numeral indicators 316 may represent a different trip fault. More specifically, in one embodiment, a positive or negative value for the numeral indicators may represent a trip fault occurring in the electrical component, whereas a zero value for the numeral indicator may represent no trip fault occurring in the electrical component. For example, all diagnostic faults that are pushed are received by the converter controller 262. However, for quick analysis, the controller 202, 262, 304 may be configured to store only a portion of the diagnostic faults received. More specifically, in certain embodiments, the first five unique trip fault categories 318 that are pushed may be stored by the power converter controller 262, e.g. as shown in FIG. 5. Thus, if five unique trip fault categories 318 are used to transmit the fault information from the electrical component to the controller 304, and the component trips with two trips, the first integer word may be set to a numeral indicator 316 indicating the category of the first occurring trip, whereas the second integer word may indicate the category of the second occurring trip, e.g. as shown in FIG. 5. For example, as shown in FIG. 5, the first numeral indicator 316 corresponds to 29 in Table 1, or "Grid Loss" and the second numeral indicator 316 corresponds to 30 in Table 1 or "Grid Overvoltage." Further, as shown, if only two trip faults occur, then the remaining three integer words may have a zero value, thereby indicating that the electrical component only experienced trips from two trip fault categories. It should be understood that any number of integer words may be used to transmit trip fault information to one or more of the controllers 202, 304, including for example, more than five or less than five integer words. Accordingly, as mentioned, the system 300 is configured to communicate a finely resolved category of individual trip faults of an electrical component of the turbine 100 to the supervisory controller 202, 304 without giving the entire list of trip faults.

In additional embodiments, the method 400 may also include storing the unique identifier 314 in a memory device 207 of one of the controllers 202, 262, 304 and/or in a data repository, e.g. such as the cloud for the purposes of fleet-level analysis. Thus, in one embodiment, the system 300 may be configured to develop statistics, trends, failure modes, etc. via data analysis, statistical algorithms, or similar. More specifically, the system 300 may be configured to utilize only one or a few members of data that can be transmitted to the supervisory controller 202, 304 for proper diagnostic analysis. For example, the controller(s) 202, 262, 304 is configured to interpret the trip enumeration(s) that are received and convert the enumeration(s) into the trip categories listed in the trip category list, e.g. as shown Table 1. The controller(s) 202, 262, 304 can then increment appropriate counters and give appropriate diagnostic messages according to the data received. When the supervisory controller 202, 304 resets the converter trip, the category words will be cleared and will be re-populated whenever new trips are pushed or when the existing trips fail to clear.

In additional embodiments, the method 400 may also include counting unique identifiers 314 for each of the plurality of trip faults stored in the controller(s) 202, 262, 304 of the wind turbine 100 over a predetermined time period. More specifically, in certain embodiments, the controller(s) 202, 262, 304 is configured to increment various counters in order to keep track of the type of converter and turbine trips that occur. For example, the unique identifier 314 may be connected to a technical stand-by counter that records the downtime and assigns a unique category to each trip. Thus, for example, when a trip is caused by an external environment, i.e. the grid, then the turbine down time is counted against an external fault identifier. The availability of a more resolved categorization of converter trips will allow such counters to better pinpoint the type of trip that caused the turbine to go off line.

Accordingly, the system and method of the present disclosure is configured to determine a cause and/or origin of a trip fault, e.g. a grid event has caused the turbine to lose operational time rather than a fault of the equipment. Such distinguishing data allows for quicker repair and less downtime. In further specific embodiments, it may also be advantageous for the turbine controller 202 to relay information about a particular printed wiring board failure in the power converter 210 or some other hardware failure, thereby allowing more efficient servicing of the turbine by repair teams.

Based on the diagnostics communication from the power converter controller 262, the supervisory controller (e.g. the turbine controller 202 or the farm-level controller 304) is configured to assign a unique Supervisory Controls and Data Acquisition (SCADA) message to the unique identifier 314. More specifically, as shown at 406, the method 400 may include sending, via the local controller 262, the unique identifier to the supervisory controller 202, 304 of the wind turbine 100. For example, as shown in FIG. 4, the system 300 may include a user interface 312. As such, the method 400 may include providing, via the user interface 312, a signal to a user if one or more particular stored unique identifiers for the trip faults exceed a predetermined threshold. In addition, the method 400 may include providing, via the user interface 312, a signal to a user if one or more particular stored unique trip fault categories exceed a predetermined threshold.

Thus, as shown at 408, the method 400 may also include implementing, via the supervisory controller 202, 304, a control action based on the unique identifier 314. More specifically, in certain embodiments, whenever a trip fault occurs, the power converter 210 is configured to start a shutdown sequence. For example, in particular embodiments, the step of implementing the control action based on the unique identifier 314 may include activating a brake procedure and/or initiating a turbine shutdown mode. In addition, the SCADA message is configured to display the unique trip identifier and the sub-component name (i.e. the component within the power converter 210), via the user interface 312, indicating the source (i.e. the sub-component) that caused the turbine system to trip.

Referring now to FIG. 7, a flow diagram of one embodiment of a method 500 for categorizing trip faults of a power converter of a wind turbine 100 is illustrated. As shown at 502, the method 500 includes detecting, via a one or more sensors communicatively coupled to a converter controller of the wind turbine, a plurality of trip faults in the power converter of the wind turbine over a predetermined time period. As shown at 504, the method 500 includes determining, via the converter controller, a unique identifier for each of the trip faults. Each unique identifier includes information regarding a type of the trip fault and at least one of an origin and/or cause of the trip fault. As shown at 506, the method 500 includes sending, via the converter controller, the unique identifiers to a supervisory controller of the wind turbine. As shown at 508, the method 500 includes storing the unique identifiers in a memory device of the supervisory controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method for managing trip faults of a power converter of a wind turbine, the method comprising:
   receiving, via a local controller of the wind turbine, an indication of a plurality of trip faults occurring in the power converter of the wind turbine;
   assigning each of the plurality of trip faults a unique numeral indicator, each of the numeral indicators representing a different trip fault category and comprising information regarding type, origin, and cause of each of the plurality of trip faults, wherein a positive value or a negative value for the numeral indicators represents a trip fault occurring in the power converter and a zero value for the numeral indicator represents no trip faults occurring in the power converter;
   generating, via the local controller, a unique identifier comprising the unique numeral indicators representing the plurality of trip faults arranged in sequential order;
   sending, via the local controller, the unique identifier to a supervisory controller of the wind turbine; and,
   activating a brake procedure or initiating a shutdown sequence, via the supervisory controller, based on the unique identifier.

2. The method of claim 1, further comprising detecting, via one or more sensors, the at least one trip fault in the power converter of the wind turbine.

3. The method of claim 2, wherein the one or more sensors comprise at least one of voltage sensors, electric current sensors, temperature sensors, humidity sensors, or airflow sensors.

4. The method of claim 1, wherein the supervisory controller comprises at least one of a turbine controller of the wind turbine or a farm-level controller of a wind farm comprising the wind turbine, and wherein the local controller comprises at least one of a turbine controller of the wind turbine or a converter controller of the power converter of the wind turbine.

5. The method of claim 1, wherein generating the unique identifier representing the plurality of trip faults further comprises:
   generating, via the supervisory controller, a trip fault category list comprising a plurality of trip fault categories, and
   assigning, via the supervisory controller, at least one of the trip fault categories from the trip fault category list to the detected trip fault.

6. The method of claim 5, further comprising modifying the trip fault category list, wherein modifying the trip fault category list further comprises at least one of adding new trip fault categories, splitting existing trip fault categories into one or more narrower trip fault categories, or deleting one or more of the trip fault categories.

7. The method of claim 5, wherein generating the unique identifier representing the plurality of trip faults further comprises:
   determining, via the supervisory controller, the type of the trip fault,
   determining, via the supervisory controller, at least one of the origin or the cause of the trip fault, and
   selecting, via the supervisory controller, the numeral indicator for each of the plurality of trip faults from the trip fault category list based on the type, origin, or cause of each of the plurality of trip faults.

8. The method of claim 1, further comprising storing the unique identifier in a memory device of at least one of the local controller, the supervisory controller, or a fleets level data repository associated with the wind turbine.

9. The method of claim 8, further comprising:
   sorting unique identifiers stored in the memory device based on at least one of the following categories: the type, the origin, or the cause of the trip fault over a predetermined time period, and
   counting the stored unique identifiers for each of the categories stored in at least one of the local controller or the supervisory controller.

10. The method of claim 9, further comprising providing, via a user interface, a signal to a user if the stored unique identifiers for one or more of the categories exceed a predetermined threshold.

11. A system for managing trip faults of a power converter of a wind turbine in a wind farm, the system comprising:
   a supervisory controller configured to provide supervisory control to one or more wind turbines of the wind farm;
   a local controller configured to provide local control of the wind turbine, the local controller communicatively coupled to the supervisory controller via a network; and
   one or more voltage and/or electric current sensors configured to detect trip faults of the power converter of the wind turbine,
   wherein at least one of the local controller or the supervisory controller are configured to perform one or more operations, the one or more operations comprising:
      assigning each of the plurality of trip faults a unique numeral indicator, each of the numeral indicators representing a different trip fault category and comprising information regarding type, origin, and cause of each of the plurality of trip faults, wherein a positive value or a negative value for the numeral indicators represents a trip fault occurring in the power converter and a zero value for the numeral indicator represents no trip faults occurring in the power converter;

generating a unique identifier comprising the unique numeral indicators representing the plurality of trip faults arranged in sequential order; and activating a brake procedure or initiating a shutdown sequence based on the unique identifier.

12. The system of claim 11, wherein generating the unique identifier representing the plurality of trip faults further comprises:

generating, via the supervisory controller, a trip fault category list comprising a plurality of trip fault categories, and assigning, via the supervisory controller, at least one of the trip fault categories from the trip fault category list to each of the plurality of trip faults.

13. The sys e of claim 12, further comprising:

storing the unique identifier in a memory device of at least one of the local controller, the supervisory controller or a fleet-level data repository associated with the wind turbine;

sorting unique identifiers stored in the memory device based on at least one of the following categories: the type, the origin, or the cause of the trip fault over a predetermined time period; and counting the stored unique identifiers for each of the categories stored in at least one of the converter controller or the supervisory controller.

14. The system of claim 13, further comprising providing, via a user interface, a signal to a user if the stored unique identifiers for one or more of the categories exceed a predetermined threshold.

* * * * *